Oct. 9, 1956

C. GREENE 2,765,511

METHOD OF FORMING RADIANT HEAT
CONDUITS IN CONCRETE BUILDINGS

Filed March 20, 1953

INVENTOR.
CURTIS GREENE
BY Munn & Liddy
ATTORNEYS

United States Patent Office 2,765,511
Patented Oct. 9, 1956

2,765,511

METHOD OF FORMING RADIANT HEAT CONDUITS IN CONCRETE BUILDINGS

Curtis Greene, Sacramento, Calif.

Application March 20, 1953, Serial No. 343,717

4 Claims. (Cl. 25—154)

An object of my invention is to provide a method of forming radiant heat conduits in concrete buildings which is a continuation-in-part of my application filed October 8, 1951, Serial No. 250,288, now abandoned, on the same method. In the application, I set forth that the invention relates to the official class of heat exchange and more particularly to a new and novel method of forming radiant heat conduits in the concrete floors of buildings.

A further object of my invention is to provide a method of forming radiant heat conduits in concrete floors that will save time and cost in the installation of the conduits in the floors. It is proposed to pour concrete around a system of soluble pipes and after the concrete has set, to remove the pipes by dissolving and flushing them from the conduits thus formed.

The material forming the pipes is made strong enough to resist any crushing by the concrete poured thereon. The pipes can be bent into any desired shapes through application of any well known softening means. One of the chief features of my invention is to provide a material for the dissolvable pipes which will float in a flushing fluid such as water. The granular particles of the material are insoluble and lighter than water so that they will be water-borne during the flushing process.

The advantages of an impervious material for the granular filling particles, held together by a soluble binder in the tubular forms, are two:

1. A pervious material will take on weight when soaked in a liquid and so may become too heavy to be completely carried away when the forms are dissolved and flushed out; and 2. A pervious material usually will swell when soaked in a liquid and may cause the grains to clog the passages, particularly at the bends or joints in the pipes, while an impervious material will not swell.

The dissolvable pipe is made of insoluble granular material of light specific gravity bound together by a fully soluble binding material, enabling the insoluble material to become completely water-borne when disengaged from the soluble binding material by water or other liquid flushed through the pipe. One suitable substance for the insoluble granular material might be volcanic perlite, which is a volcanic glass with a concentric shelly structure, expanded by the application of heat. Sawdust particles could be waterproofed and then bound together by a soluble cement or a glutinous material that would dissolve in the flushing fluid and free the sawdust particles so that they could be floated away with the fluid.

The tubular dissolvable forms are protected on their outer surfaces by a fine non-corrosive wire wesh strip that is wrapped spirally around the dissolvable form. Another suitable material for protecting the pipe could be a strip of spun glass mesh such as Fiberglas.

Other objects and advantages will appear in the following specification, and the novel features of the device will be particularly pointed out in the appended claims.

My invention is illustrated in the accompanying drawing forming a part of this application, in which.

While I have shown only the preferred form of my invention, it should be understood that various changes or modifications may be made within the scope of the appended claims without departing from the spirit and scope of the invention.

Figure 1:
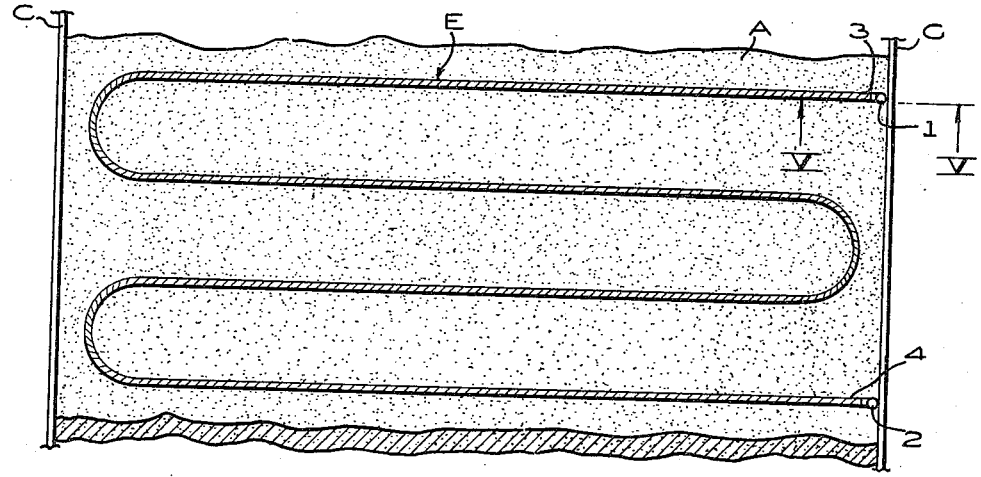
Figure 1 is a plan view of a soluble pipe laid on a pre-poured concrete base, prior to pouring a covering layer of concrete over the pipe.
Figure 2:
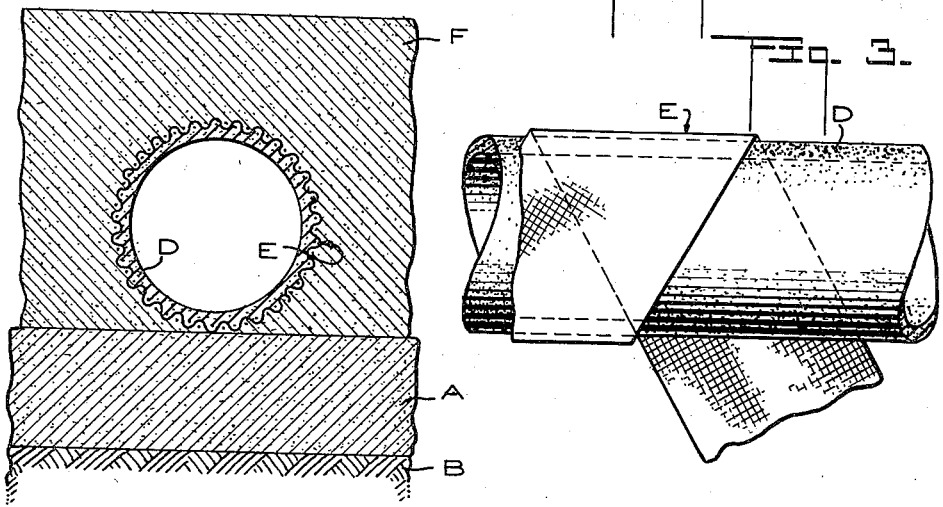
Figure 2 is a cross sectional view of the embedded pipe shown lying on the concrete base and embedded in the upper layer of concrete.
Figure 3:
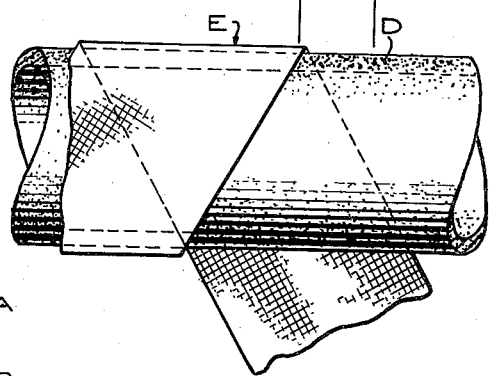
Figure 3 is an enlarged view of a portion of the soluble pipe and illustrates how the outer surface of the pipe is wrapped in a protective strip of non-corrosive wire mesh or spun glass.

In carrying out my invention, I provide a lower layer of concrete A, see Figure 1, and this pre-poured layer constitutes the concrete base. The concrete base is preferably poured on the ground B, see Figure 2, and between form boards C. The soluble core indicated generally at D is laid upon the concrete base A and is bent and curved in any desired manner. Conduits 1 and 2 may be applied to the ends 3 and 4 for the purpose of forcing air through the soluble core to test the core D before pouring the upper concrete layer F to make sure that there is no obstruction and to clean out any foreign matter that might be lying therein.

Before the soluble core D is laid on the concrete base, it is preferably externally wrapped with a tape E that can be made of a non-corrosive wire mesh or spun glass. The soluble core D as shown in Figure 1 has the tape E wrapped therearound. The soluble core is formed from an impervious granular material such as expanded perlite or waterproofed sawdust and the granular particles are held together by a glutinous material which will dissolve in water. I wish the term glutinous material to be broad enough to include any type of adhesive which will hold the granular material together, but which will dissolve when water is flushed through the soluble core or other liquid is forced therethrough so as to permit the granular impervious particles to break up and be floated away with the liquid.

The granular particles are preferably light enough to float in the liquid although they do not necessarily have to be lighter than the liquid that is used to flush them out. If, for example, the granular particles are of the same specific gravity, or a very little heavier than the liquid, they will still be borne away by the liquid when there is a strong current flowing through the passage. However, grains that are a little lighter than the liquid are preferable.

The floatable character of the granular material forming the soluble core is indispensable in clearing long passages since all of the unsoluble matter must be water-borne. If this were not true the joints in the soluble core or the curved portions would become clogged with the granular material. Before the upper layer F of the concrete floor is poured, the mesh of the helically wrapped strip E should be dampened and impregnated with cement. This will insure its adhering strongly to the upper layer F of the concrete so that it will not become disengaged from the concrete F when the soluble core is washed away. Also, the strip E will remain adhered to the concrete F when the passages it encloses are used for the carrying of a heated liquid such as hot water. With the cement that closes the openings in the tape E it may be possible to mix a dry waterproofing material and this material would not disintegrate when the dissolvable pipe is flushed out. Moreover, the waterproofing material in the strip or tape E would prevent the moisture from the upper layer of concrete during the pouring of the latter, from gaining access to the soluble pipe and cause it to disintegrate or dissolve prematurely.

I do not wish to be confined to any particular size of granular material used. Such material may vary from the size of the small grains of sand to larger grains of sand. The larger the diameter of the soluble core, the larger the grains can be used.

In the actual mixing of the granular material with the adhesive or glutinous material so as to form the soluble binder, the binder is likely to be much more costly than the grains volume for volume. The size of the grains could be graded from fine to coarse in a way to reduce to a minimum the voids between the grains that have to be filled with the binder.

At the time the top layer F is to be poured, all of the mesh covered outer surfaces of the soluble forms D are thoroughly moistened either with a spray or a brush so that the insoluble cement in the voids in the tape E will set and be bonded with the concrete to be poured and which will form the upper layer F. As an alternative to using dry waterproofing compound mixed with the insoluble cement in the tape mesh, this compound may be omitted, and a liquid waterproofing compound may be used instead of water for moistening the outer surface of the helically wrapped tapes just before the top course of the floor slab is poured. This will protect the soluble core from disintegrating at the time the top course of concrete F is poured.

Figure 4:
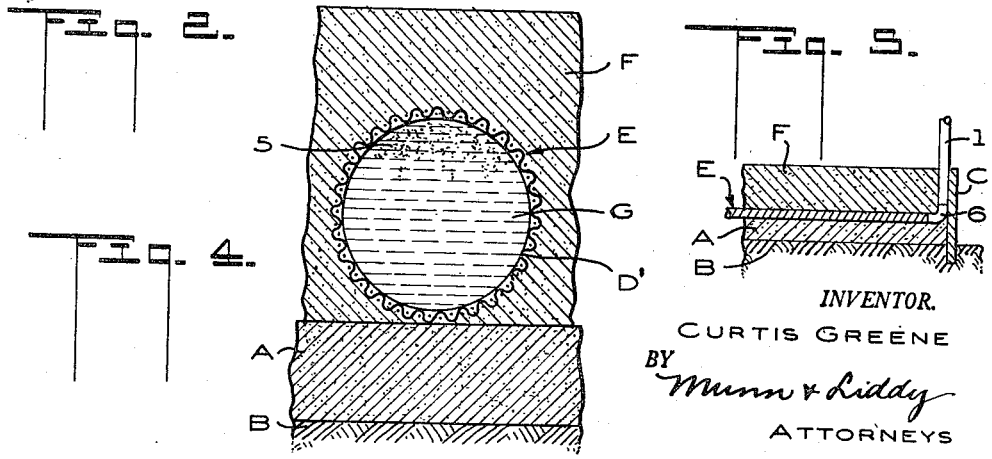
Figure 4 is a view similar to Figure 2, and illustrates how the soluble pipe may be flushed away after the concrete has set, leaving only a conduit in the concrete, lined with the non-corrosive wire mesh or spun glass.

The top course of concrete F is allowed to set and then the conduits 1 and 2 are used for forcing a fluid indicated at G, in Figure 4, through the soluble core D. This fluid will dissolve the soluble core D and leave only the helically wound tape E as a lining for the passage D' in the concrete. Figure 4 illustrates how the granular particles 5, forming the soluble core, will be floated away with the fluid. When the entire soluble core is thus washed away, the remaining passage D' will be formed in the top layer of concrete F and will be ready to convey heated liquid for the purpose of heating the floors of the building in which the passage is formed.

The dissolvable core D is made up of granular particles 5 of impervious material mixed with a soluble binder and then the mixture is formed into tubes of the desired diameter and wall thickness. The soluble binder fills all of the interstices between adjacent granular particles. The outer surface of the tube is then protected by a covering of a non-rusting mesh material which is preferably in a tape form and helically wrapped around the tube.

In practice, the conduits 1 and 2 will become permanent parts of the piping system. The conduits are bent at right angles so as to project vertically out of the concrete upper layer F, see Figure 5. The first purpose of the conduits is to flush out the dissolvable core D with fluid after the concrete has set. After this is completed, the conduits 1 and 2 are then used as connections for the permanent hot water or hot air heating system.

The floating characteristics of the insoluble aggregate making up the pipe D becomes indispensable where the concrete slab comprising the layers A and F, might be at a point lower than the outlet of the piping system that carries the hot water or hot air to the final passage D' in the slab. A concrete floor could be poured below ground level and this would necessitate the floating of the granular particles of the disintegrated pipe D, during the flushing process, up to at least ground level so that they could be carried away from the concrete slab.

Figure 5:
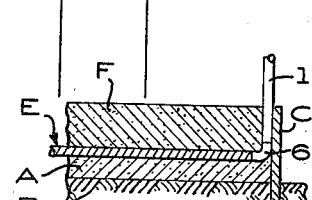
Figure 5 is a section along the line V—V of Figure 1.

The drawing shows an elbow 6 for the pipe D in Figure 5. In actual practice, joints and T's would be used and preferably made of light metal that would remain in the concrete slab after the pipe D has been flushed out. The joints or T's would have tapered ends for receiving the ends of the pipes D that fit thereinto. Figure 5 is a section taken along the line V—V of Figure 1, and in addition shows the upper layer of concrete F which is not shown in Figure 1.

I claim:

1. The herein described method of forming a system of conduits in concrete floors comprising: laying a system of tubular forms on a concrete supporting base, the tubular forms being made of a granular floatable impervious material held together by a soluble binder and enclosed in a mesh of tubular form; pouring concrete on the base and enclosing the tubular forms and permitting the poured concrete to set; and flowing a dissolving fluid through the tubular forms for dissolving the soluble binder and freeing the granular floatable impervious material so that it will be flushed away with the fluid and carried out of the conduit so as to leave a conduit in the concrete, lined with a tubular mesh.

2. The herein described method of forming a system of conduits in concrete floors comprising: laying a system of tubular forms on a concrete supporting base; the tubular forms being made of a granular floatable impervious material held together by a soluble binder and enclosed in a mesh of tubular form; sealing the interstices of the mesh with a self-setting and moisture resistant coating; pouring concrete on the base and enclosing the tubular forms and permitting the poured concrete to set; and flowing a dissolving fluid through the tubular forms for dissolving the soluble binder and freeing the granular floatable impervious material so that it will be flushed away with the fluid and carried out of the conduit so as to leave a conduit in the concrete that is lined with a tubular mesh whose self-setting coating becomes attached to the previously poured concrete.

3. The herein described method of forming a system of conduits in concrete floors comprising: laying a system of tubular forms on a concrete supporting base, the tubular forms being made of a granular floatable material held together by a soluble binder and enclosed in a mesh of tubular form; pouring concrete on the base and enclosing the tubular forms and permitting the poured concrete to set; and flowing a dissolving fluid through the tubular forms for dissolving the soluble binder and freeing the granular floatable material so that it will be flushed away with the fluid and carried out of the conduit so as to leave a conduit in the concrete, lined with a tubular mesh.

4. The herein described method of forming a conduit in a concrete floor comprising: laying a tubular form on a concrete supporting base, the tubular form being made of a granular floatable material held together by a soluble binder; pouring concrete on the base and enclosing the tubular form and permitting the concrete to set; and flowing a dissolving fluid through the tubular form for dissolving the soluble binder and freeing the granular floatable material so that it will be flushed away with the fluid and carried out of the conduit thus formed and thereby leaving a conduit in the concrete.

References Cited in the file of this patent

UNITED STATES PATENTS

| | | |
|---|---|---|
| 525,202 | Granjon et al. | Aug. 28, 1894 |
| 827,223 | Firey | July 31, 1906 |
| 1,442,777 | Corr | Jan. 16, 1923 |
| 1,544,592 | Murray | July 7, 1925 |
| 1,588,008 | Burdette | June 8, 1926 |